United States Patent [19]

Hasegawa et al.

[11] Patent Number: 4,572,141
[45] Date of Patent: Feb. 25, 1986

[54] METHOD OF CONTROLLING INTAKE AIR QUANTITY FOR INTERNAL COMBUSTION ENGINES

[75] Inventors: Shumpei Hasegawa, Niiza; Yoshibumi Mishima, Wako; Noriyuki Kishi, Itabashi; Yuzi Makino, Mitaka, all of Japan

[73] Assignee: Honda Giken Kogyo K.K., Tokyo, Japan

[21] Appl. No.: 684,688

[22] Filed: Dec. 21, 1984

[30] Foreign Application Priority Data

Dec. 23, 1983 [JP] Japan ................................ 58-243490

[51] Int. Cl.$^4$ ............................................. F02M 23/04
[52] U.S. Cl. ..................................... 123/339; 123/585
[58] Field of Search ................. 123/388, 465, 339, 585

[56] References Cited

U.S. PATENT DOCUMENTS 4,479,471 10/1984 Hasegawa et al. .................. 123/339

FOREIGN PATENT DOCUMENTS 183838 10/1983 Japan ..................................... 123/339
2118743 11/1983 United Kingdom ................ 123/339

*Primary Examiner*—William A. Cuchlinski, Jr.
*Attorney, Agent, or Firm*—Arthur L. Lessler

[57] ABSTRACT

A method of controlling the quantity of supplementary air being supplied to an internal combustion engine having first and second control valves arranged, respectively, in first and second auxiliary air passages bypassing the throttle valve for on-off control of the opening areas of the respective auxiliary air passages. When the engine is operating in a particular operating condition, the first and second control valves are selectively actuated in response to the detected value of atmospheric pressure encompassing the engine in such a manner that the sum of the opening areas of the first and second auxiliary air passages increases as the detected value of the atmospheric pressure decreases. The engine is determined to be operating in the particular operating condition when it is in a cranking condition, when a predetermined period of time has not yet elapsed after the engine has got out of a cranking condition, or when the engine is in a warming-up condition. Preferably, the engine includes a third control valve arranged in a third auxiliary air passage bypassing the throttle valve, and adapted to increase the opening area of the third auxiliary air passage with a decrease in the engine temperature for controlling the supplementary air quantity to be supplied to the engine through the third auxiliary air passage to an appropriate value when the engine is operating in a warming-up condition at a predetermined reference atmospheric pressure.

14 Claims, 14 Drawing Figures

ENGINE COOLING
WATER TEMPERATURE

METHOD OF CONTROLLING INTAKE AIR QUANTITY FOR INTERNAL COMBUSTION ENGINES

BACKGROUND OF THE INVENTION

This invention relates to a method of controlling intake air quantity for internal combustion engines, and more particularly to a method of this kind which is capable of supplying with accuracy a required quantity of supplementary air to the engine when the engine is operating in a particular operating condition at a low atmospheric pressure, such as at a high altitude.

A method of controlling intake air quantity is generally known, which is adapted to supply the engine with supplementary air in quantities responsive to the engine temperature, e.g. the engine cooling water temperature, when the engine is operating in particular operating conditions such as in cranking and warming-up conditions, to thereby ensure stable startability of the engine and prompt completion of the warming-up of the engine.

To carry out the intake air quantity control method mentioned above, a supplementary air quantity control system has been proposed, e.g. by U.S. Pat. No. 4,479,471 issued Oct. 30, 1984, which comprises a fast idling control valve arranged in an auxiliary air passage bypassing the throttle valve and adapted to open and close by means of thermal expansion and contraction of a thermally expandable member responsive to the engine cooling water temperature for regulating the supplementary air quantity, and a solenoid control valve arranged in another auxiliary air passage bypassing the throttle valve and adapted to open with a valve opening duty ratio dependent on the engine cooling water temperature.

According to the proposed method, however, when the engine is operating in a particular operating condition at a low atmospheric pressure such as at a high altitude, there can occur a shortage of supplementary air if the engine is supplied with a quantity of supplementary air which is dependent solely upon the engine temperature and set at a value appropriate to a corresponding particular operating condition at a reference atmospheric pressure, e.g. standard atmospheric pressure, since the mass flow rate of intake air supplied to the engine per suction stroke of same decreases with a decrease in the density of air in a low atmospheric pressure condition. This makes it difficult to achieve desirable startability of the engine and also to maintain the idling speed of the engine at a required value while the engine is idling for warming-up after completion of cranking operation, making the operation of the engine unstable.

SUMMARY OF THE INVENTION

It is the object of the invention to provide an intake air quantity control method for internal combustion engines, which is capable of supplying with accuracy a required quantity of air to the engine when the engine is operating in a particular operating condition at a low atmospheric pressure such as at a high altitude, particularly at the start of the engine in cold weather, to thereby achieve smooth and positive startability of the engine and improve the operating stability of same during warming-up operation.

The invention provides a method of controlling the quantity of intake air being supplied to an internal combustion engine having an intake passage, a throttle valve arranged in the intake passage, a first auxiliary air passage bypassing the throttle valve, a first control valve arranged in the first auxiliary air passage for controlling the quantity of supplementary air to be supplied to the engine through the first auxiliary air passage by means of on-off control of the opening area of the first auxiliary air passage, a second auxiliary air passage bypassing the throttle valve, and a second control valve arranged in the second auxiliary air passage for controlling the quantity of supplementary air to be supplied to the engine through the second auxiliary air passage by means of on-off control of the opening area of the second auxiliary air passage. The method is characterized by comprising the following steps: (1) detecting atmospheric pressure encompassing the engine; (2) determining whether or not the engine is operating in a particular operating condition; and (3) selectively actuating the first and second control valves in response to the value of the atmospheric pressure detected at the step (1) in such a manner that the sum of the opening areas of the first and second auxiliary air passages increases as the detected value of the atmospheric pressure decreases, when the engine is determined to be operating in the particular operating condition.

Preferably, the engine is determined to be operating in the particular operating condition when it is in a cranking condition, when a predetermined period of time has not yet elapsed after the engine has got out of a cranking condition, or when the engine is in a warming-up condition.

Also preferably, the engine includes a third auxiliary air passage bypassing the throttle valve, and a third control valve arranged in the third auxiliary air passage and adapted to increase the opening area of the third auxiliary air passage with a decrease in the temperature of the engine for controlling the quantity of supplementary air to be supplied to the engine through the third auxiliary air passage to an appropriate value when the engine is operating in a warming-up condition at a predetermined reference atmospheric pressure. The opening area of the first auxiliary air passage assumed when the first control valve is open is smaller than the opening area of the second auxiliary air passage assumed when the second control valve is open.

Still preferably, the first control valve has a valve opening period thereof controlled with a duty ratio corresponding to the difference between the actual engine speed and a desired engine speed when the engine is operating in an idling condition immediately after completion of warming-up operation of same.

Preferably, the duty ratio for opening the first control valve has an initial value thereof set to such a value that the maximum possible quantity of supplementary air is supplied to the engine through the first control valve when the value of the atmospheric pressure detected at the step (1) is lower than a predetermined value, and set to such a value that a quantity of supplementary air intermediate between the maximum possible quantity and the minimum possible quantity is supplied to the engine through the first control valve when the detected value of the atmospheric pressure is higher than the predetermined value, whereby the duty ratio control of the first control valve is initiated with the initial value of the duty ratio thus set.

Further preferably, the method of the invention includes the step of detecting a value of the temperature of the engine, and wherein when the value of the atmospheric pressure detected at the step (1) is lower than a predetermined value and at the same time the detected value of the engine temperature is lower than a predetermined value, both the first and second control valves are actuated, whereas when the detected value of the atmospheric pressure is lower than the predetermined value and at the same time the detected value of the engine temperature is higher than the predetermined value, the first control valve is rendered inoperative while the second control valve is actuated.

The above and other objects, features and advantages of the invention will be more apparent from the ensuing detailed description taken in conjunction with the accompanying drawings.

DETAILED DESCRIPTION

The method of the invention will be described in detail with reference to the accompanying drawings.

Figure 1:
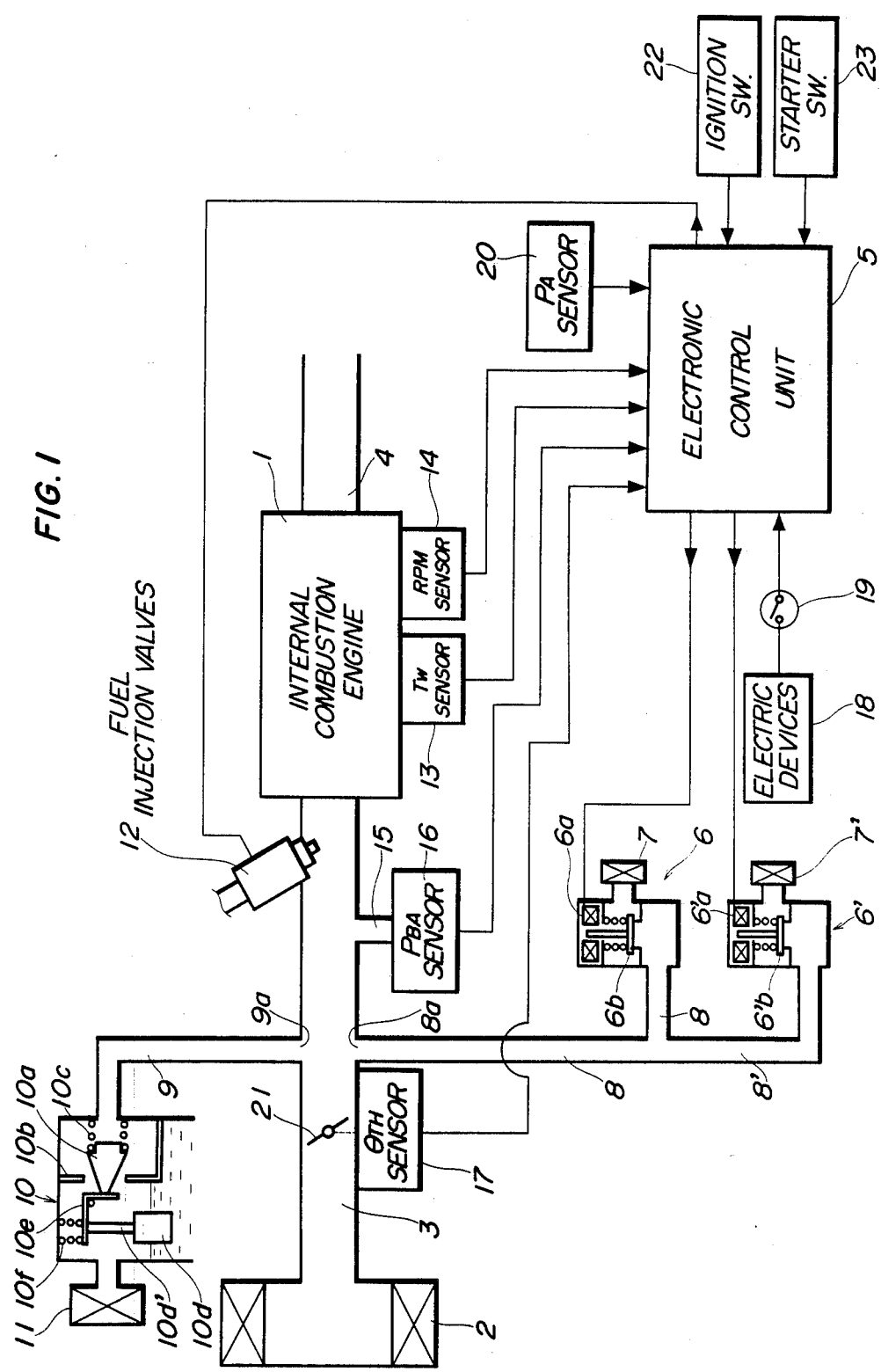
FIG. 1 is a block diagram illustrating the whole arrangement of a supplementary air quantity control system for an internal combustion engine, to which is applied the method of the invention.

Referring first to FIG. 1, a supplementary air quantity control system is schematically illustrated, to which is applied the method of the invention. In FIG. 1, reference numeral 1 designates an internal combustion engine which may be a four-cylinder type, and to which are connected an intake pipe 3 with an air cleaner 2 mounted at its open end and an exhaust pipe 4, at an intake side and at an exhaust side of the engine 1, respectively. A throttle valve 21 is arranged within the intake pipe 3, and a first auxiliary air passage 8 and a fast idling air passage 9 open at their open ends 8a and 9a into the intake pipe 3 at locations downstream of the throttle valve 21 and communicate at the other ends with the atmosphere. An air cleaner 7 is mounted at the other end of the first auxiliary air passage 8. Arranged across the first auxiliary air passage 8 is a first supplementary air quantity control valve (hereinafter merely called "the first control valve") 6 which controls the quantity of supplementary air being supplied to the engine 1 through the first auxiliary air passage 8. This first control valve 6 is a normally closed type and comprises a solenoid 6a and a valve body 6b disposed to open the first auxiliary air passage 8 when the solenoid 6a is energized. The solenoid 6a is electrically connected to an electronic control unit (hereinafter called "the ECU") 5.

A second auxiliary air passage 8' branches off from the first auxiliary air passage 8 at a location downstream of the first control valve 6, of which the atmosphere-opening end is provided with an air cleaner 7'. A second supplementary air quantity control valve (hereinafter called "the second control valve") 6', which is a normally closed type as the first control valve 6, is arranged across the second auxiliary air passage 8'. This second control valve 6' comprises a solenoid 6'a and a valve body 6'b disposed to open the second auxiliary air passage 8' when the solenoid 6'a is energized. The solenoid 6'a is electrically connected to the ECU 5. The valve opening area of the second control valve 6' assumed when its valve body 6'b is open is set at a value (e.g. 11.5 mm$^2$) larger than that of the first control valve 6 assumed when the valve body 6b is open (e.g. 5.7 mm$^2$)

The fast idling air passage 9 is provided with an air cleaner 11 at its atmosphere-opening end, and a fast idling control valve 10 is arranged across the same passage 9. The fast idling control valve 10 comprises, for instance, a valve body 10a disposed to be urged against its valve seat 10b by a spring 10c for closing the air passage 9, a sensor means 10d adapted to stretch or contract its arm 10d' in response to the engine cooling water temperature, and a lever 10e pivotable in response to the stretching and contracting action of the arm 10d' of the sensor means 10d for displacing the valve body 10a so as to open or close the air passage 9.

Fuel injection valves 12 are arranged in a manner projected into the interior of the intake pipe 3 at a location between the engine 1 and the open ends 8a and 9a of the first auxiliary air passage 8 and the fast idling air passage 9, both opening into the intake pipe 3. An intake pipe absolute pressure (PBA) sensor 16 is provided in communication through a conduit 15 with the intake pipe 3 at a location between the engine 1 and the open ends 8a, 9a of the air passages 8, 9. The fuel injection valves 12 are connected to a fuel pump, not shown, and also electrically connected to the ECU 5, while the intake pipe absolute pressure (PBA) sensor 16 is electrically connected to the ECU 5. A throttle valve opening ($\theta$TH) sensor 17 is connected to the throttle valve 21 for detecting its valve opening, while an engine temperature (TW) sensor 13 for detecting the engine cooling water temperature as representing the engine temperature, and an engine rotational angle position/RPM sensor 14 are both mounted on the body of the engine 1, and are electrically connected to the ECU 5. The engine rotational angle position/RPM sensor 14 is adapted to detect a particular crank angle position of each of the engine cylinders, which is in advance of the top-dead-center position (TDC) of a piston in the corresponding cylinder by a predetermined crank angle, and to supply the ECU 5 with a predetermined control signal indicative of the detected particular crank angle position of the engine (hereinafter called "the TDC signal").

In FIG. 1, reference numeral 18 denotes electrical devices such as head lamps, a brake lamp and a radiator cooling electric fan, which are electrically connected to the ECU 5 by way of switches 19. Reference numeral 20 designates an atmospheric pressure (PA) sensor for detecting the atmospheric pressure encompassing the engine 1, 22 an ignition switch, and 23 a starter switch, respectively. The sensor 20 and switches 22, 23 supply the ECU 5 with a signal indicative of the detected atmospheric pressure, a signal indicative of the on and off states of the ignition switch 22, and a signal indicative of the on and off states of the starter switch 23, respectively.

The supplementary air quantity control system constructed as above operates as follows:

The fast idling control valve 10 operates when the engine cooling water temperature is lower than a predetermined value (e.g. 60° C.), such as at the start of the engine in cold weather. More specifically, the sensor means 10d stretches or contracts its arm 10d' in response to the engine cooling water temperature. This sensor means 10d may comprise any suitable sensing means, such as wax filled within a casing, which is thermally expandable. When the engine cooling water temperature is lower than the predetermined value, the arm 10d' is in a contracted state, with the lever 10e biased by the force of the spring 10f in such a position as to displace the valve body 10a in a rightward direction as viewed in FIG. 1 against the force of the spring 10c whereby the air passage 9 opens. Since the air passage 9 thus opened allows the supply of a sufficient amount of supplementary air to the engine through the filter 11 and the air passage 9, the engine speed can be maintained at a higher value than a normal idling speed when the engine is operating in a reference atmospheric pressure condition, e.g. under standard atmospheric pressure, thereby ensuring smooth and stable idling operation of the engine even in cold weather without the fear of engine stall.

As the arm 10d' of the sensor means 10d is stretched with an increase in the engine cooling water temperature due to the warming-up of the engine, it pushes the lever 10e upward as viewed in FIG. 1 to rotate same in the clockwise direction. Then, the valve body 10a becomes moved leftward as viewed in FIG. 1, rather by the force of the spring 10c. When the engine cooling water temperature exceeds the predetermined value, the valve body 10a comes into urging contact with the valve seat 10b to close the air passage 9, thereby interrupting the supply of supplementary air through the fast idling control valve 10.

Figure 2:
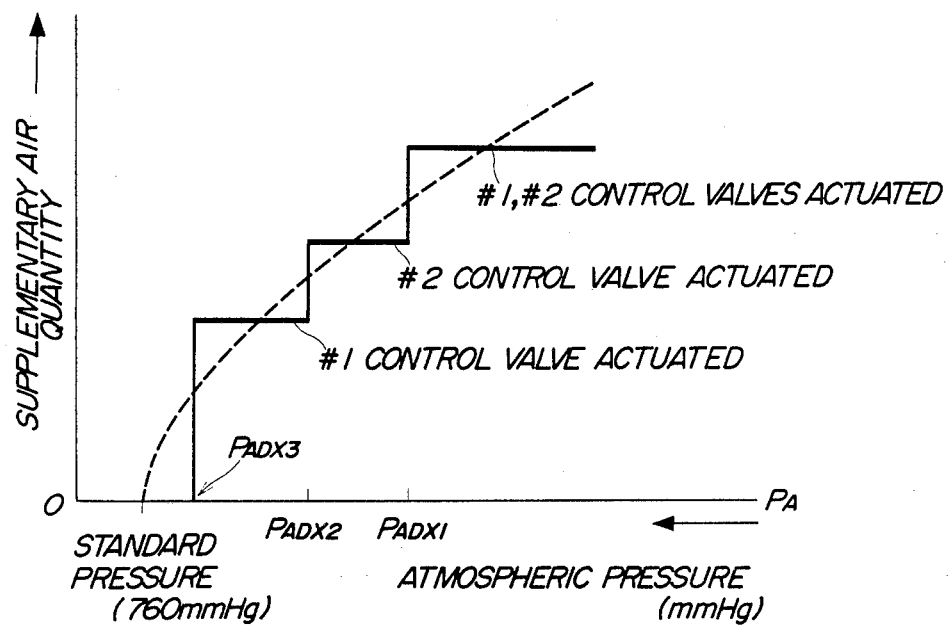
FIG. 2 is a graph showing a change in the supplementary air quantity to be supplied to the engine, relative to a decrease in the atmospheric pressure PA.

The first and second control valves 6, 6' operate to supply the engine with supplementary air when the engine is operating in a low atmospheric pressure condition, such as at a high altitude, so as to compensate for a decrease in the mass flow rate of intake air resulting from a decrease in the atmospheric pressure. The graph of FIG. 2 plots the relationship between the atmospheric pressure and the intake air quantity to be supplemented with a decrease in the atmospheric pressure from the reference or standard atmospheric pressure (760 mmHg), i.e. the quantity of supplementary air to be supplied through the first and second control valves 6, 6' (indicated by the broken line in the figure), in the event that the fast idling control valve 10 is operative when the engine cooling water temperature TW assumes a certain constant value lower than the predetermined value (60° C). In order to supply the engine with a quantity of supplementary air corresponding to the atmospheric pressure, one or both of the first and second control valves 6, 6' are selectively actuated.

The reason for employing two or first and second control valves 6, 6' is as follows: If a single control valve is employed for control of the supplementary air quantity, the control valve is required to have a large opening area corresponding to the sum of the opening areas of the two control valves 6, 6' assumed when their valve bodies are open. The large opening area of the control valve makes it difficult to ensure sufficient airtightness of the same valve, and requires a large operating force to open the valve body against an urging force caused by a negative pressure acting upon the valve body at its one end face, which force is large correspondingly to the large opening area. Therefore, the control valve has to have a large overall size, resulting in a higher production cost than the cost for employing two control valves as in the present invention.

TABLE 1 given below shows various modes of operating the first and second control valves 6, 6':

TABLE 1

|  | Mode | | | | |
| --- | --- | --- | --- | --- | --- |
|  | 0 | I | II | III | IV |
| First Control Valve 6 | Duty Ratio Control (0-100%) | OFF | ON | OFF | ON |
| Second Control Valve 6' | OFF | OFF | OFF | ON | ON |

The operating mode 0 is carried out when the engine is operating in an idling condition following the warming-up, so as to control the engine speed to a desired idling speed in a feedback manner (hereinafter called "the automatic idling control"), wherein the duty ratio control of the first control valve 6 is effected while the second control valve 6' is kept inoperative, as hereinafter described in detail. In the operating modes I to IV, the control valves 6, 6' are controlled in an on-off manner, and as the operating mode shifts in the order of I, II, III and IV, the sum of the opening areas of the first and second auxiliary air passages 8, 8', i.e. the quantity of supplementary air, becomes increased.

The ECU 5 performs the control of the first and second control valves 6, 6' as well as the fuel injection valves 12 in synchronism with inputting of the TDC signal thereto and in response to various engine operation parameter signals from the throttle valve opening ($\theta$TH) sensor 17, the absolute pressure (PBA) sensor 16, the engine cooling water temperature (TW) sensor 13, the engine rotational angle position/RPM sensor 14, and the atmospheric pressure (PA) sensor 20, as well as a signal indicative of electrical loads on the engine 1 from the electrical devices 18 and on-off signals from the ignition switch 22 and the starter switch 23. To be specific, upon application of each TDC signal pulse to the ECU 5, it determines the operating condition and loaded condition of the engine 1 from the read values of the various signals mentioned above, then calculates a desired quantity of fuel to be supplied to the engine 1, that is, a desired valve opening period of the fuel injection valves 12, which is appropriate to the determined conditions of the engine, and supplies driving signals corresponding to the calculated valve opening period value to the fuel injection valves 12 to drive them. The ECU 5 also selects the operating mode of the first and second control valves 6, 6' and calculates a duty ratio value for opening the first control valve 6, and supplies the control valves 6, 6' with driving signals in accordance with the selected operating mode and the determined valve opening duty ratio, to drive the same valves, as hereinafter described in detail.

The first and second control valves 6, 6' are energized by the driving signals supplied from the ECU 5, to open their valve bodies 6b, 6b' and accordingly their respective air passages 8, 8' for supplying the engine 1 with a required quantity of supplementary air.

The fuel injection valves 12 are energized by driving signals to open for a period of time corresponding to the calculated valve opening period value to inject fuel into the intake pipe 3, to thereby supply an air/fuel mixture having a desired air/fuel ratio, e.g. a theoretical air/fuel ratio, to the engine 1.

Figure 3:
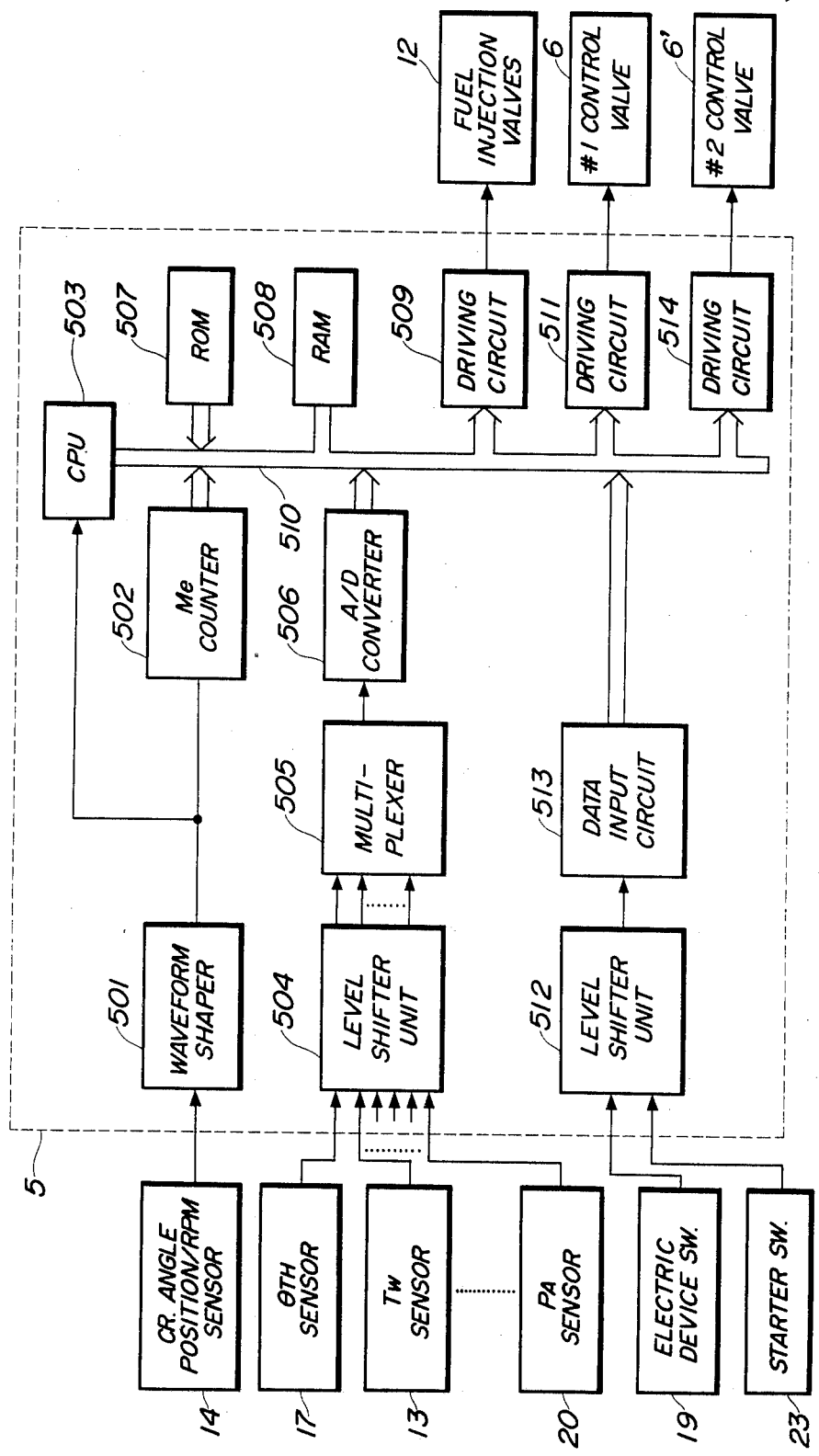
FIG. 3 is a circuit diagram showing the internal arrangement of an electronic control unit (ECU) appearing in FIG. 1.

FIG. 3 shows a circuit configuration within the ECU 5 in FIG. 1. The TDC signal from the engine rotational angle position/RPM sensor 14 in FIG. 1 is applied to a waveform shaper 501, wherein it has its pulse waveform shaped, and supplied to a central processing unit (hereinafter called "the CPU") 503 as well as to an Me value counter 502. The Me value counter 502 counts the interval of time between a preceding pulse of the TDC signal and a present pulse of the same signal, inputted thereto from the sensor 14, and therefore its count value Me is proportional to the reciprocal of the actual engine speed Ne. The Me value counter 502 supplies the count value Me to the CPU 503 via a data bus 510.

The respective output signals from the throttle valve opening ($\theta$TH) sensor 17, the intake pipe absolute pressure (PBA) sensor 16, the engine cooling water temperature (TW) sensor 13, the atmospheric pressure (PA) sensor 20, etc. have their voltage levels shifted to a predetermined voltage level by a level shifter unit 504 and successively applied to an analog-to-digital converter 506 through a multiplexer 505. The analog-to-digital converter 506 successively converts into digital signals analog output voltages from the aforementioned various sensors, and the resulting digital signals are supplied to the CPU 503 via the data bus 510.

The on-off signals from the switches 19 of the electrical devices 18, the starter switch 23, etc. are shifted into a predetermined voltage level by a level shifter unit 512, then converted into corresponding digital signals by a data input circuit 513, and supplied to the CPU 503 via the data bus 510.

Further connected to the CPU 503 via the data bus 510 are a read-only memory (hereinafter called "the ROM") 507, a random access memory (hereinafter called "the RAM") 508, and driving circuits 509, 511 and 514. The RAM 508 temporarily stores various calculated values from the CPU 503, while the ROM 507 stores control programs executed within the CPU 503, etc.

The CPU 503 executes the control programs stored in the ROM 507 to determine the operating conditions, such as a starting condition, of the engine and the loaded conditions of same on the basis of the values of the aforementioned various engine operation parameter signals, select the operating mode of the first and second control valves 6, 6' for controlling the supplementary air quantity, and calculate the valve opening duty ratio DOUT for the first control valve 6 as well as the valve opening period for the fuel injection valves 12. Then, the CPU 503 supplies control signals corresponding to the selected operating mode and the calculated valve opening duty ratio DOUT to the driving circuits 511, 514 via the data bus 510, and also supplies a control signal corresponding to the calculated valve opening period value for the fuel injection valves 12 to the driving circuit 509 via the data bus 510. The driving circuit 509 is responsive to the control signal applied thereto to supply driving pulses to the fuel injection valves 12 to energize same, while the driving circuits 511, 514 are responsive to their control signals to supply driving pulses to the first and second control valves 6, 6' for energizing same in an on-off manner.

Figure 4:
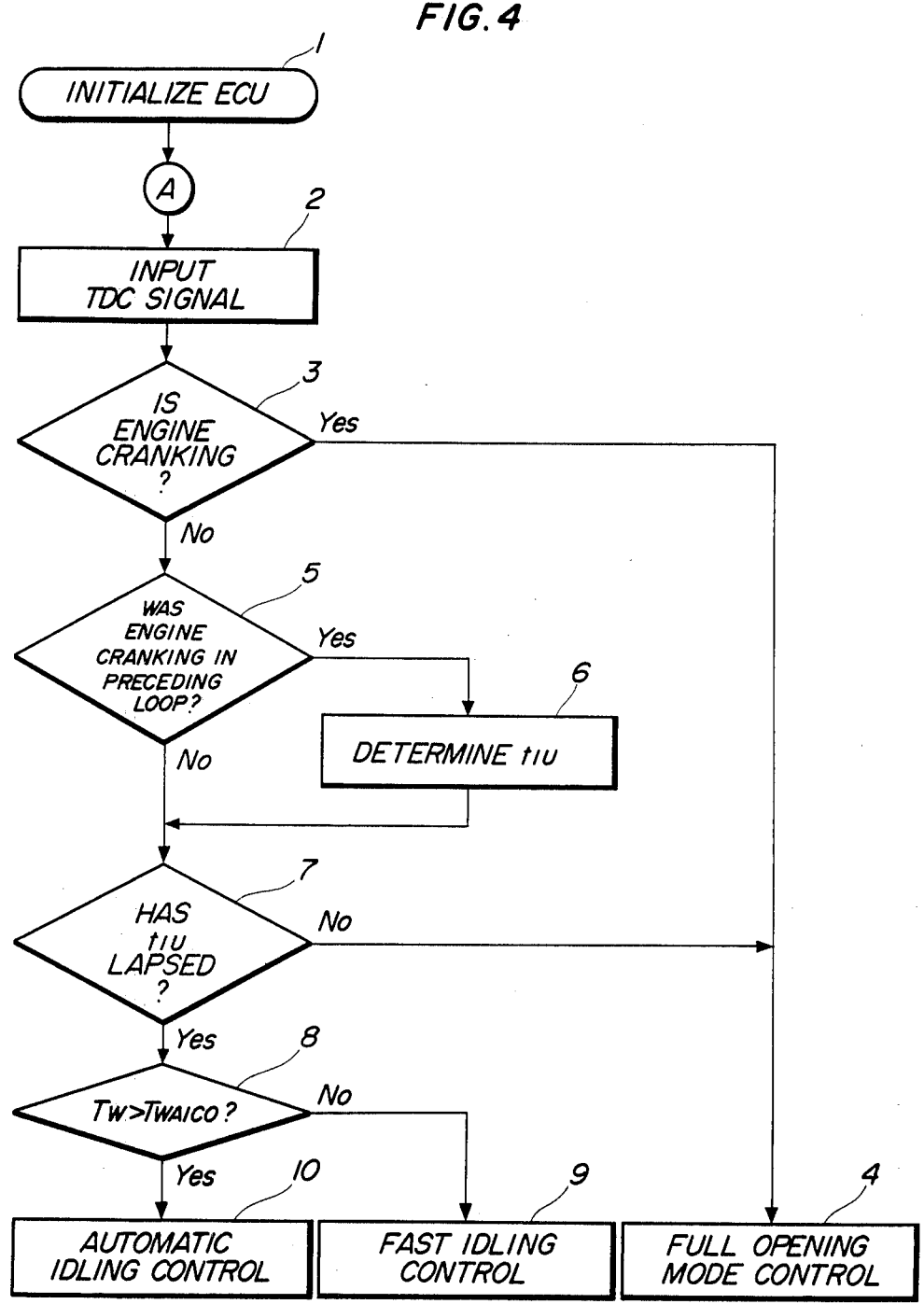
FIG. 4 is a flowchart of a manner of carrying out control of the first and second control valves, which is executed within the ECU.

FIG. 4 shows a flowchart of a program for controlling the first and second control valves 6, 6', which is executed within the CPU 503.

The present program is carried out after the ignition switch 22 has been turned on to initialize the ECU 5 (step 1), and is started with the steps following the entry point A which are executed in synchronism with generation of the TDC signal. The TDC signal from the engine rotational angle position/RPM sensor 14 in FIG. 1 is inputted to the ECU 5 at the step 2, and then it is first determined whether or not the engine is operating in a cranking condition, at the step 3. This determination at the step 3 can be made, for instance, by determining whether or not the engine speed Ne is lower than a cranking speed NCR (e.g. 400 rpm) and whether or not the starter switch 23 in FIG. 1 is in an on state. If the answer to the question at the step 3 is yes, that is, the engine is cranking, the program proceeds to the step 4 to carry out full opening mode control wherein supplementary air is supplied to the engine 1 so as to facilitate starting of the engine and allow the engine speed to promptly reach the idling speed. During the full opening mode control, the first and second control valves 6, 6' are selectively actuated in accordance with the operating mode selected in response to the atmospheric pressure, as hereinafter described in detail.

Figure 5:
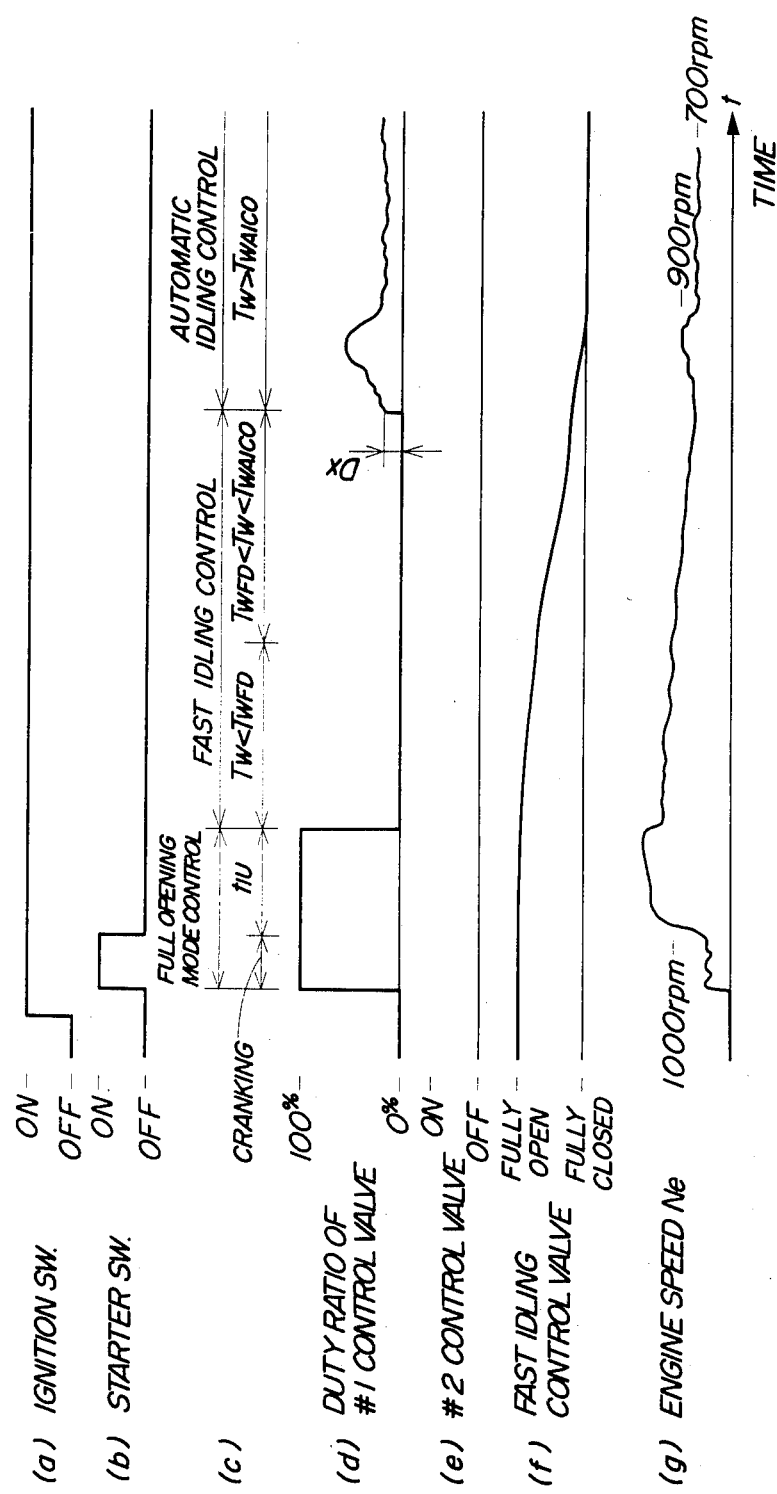
FIG. 5 is a timing chart showing changes in the operative states of the first and second control valves and the fast idling control valve (the third control valve) with respect to the lapse of time, applicable when the atmospheric pressure PA is higher than or equal to a predetermined value PADX3.
Figure 6:
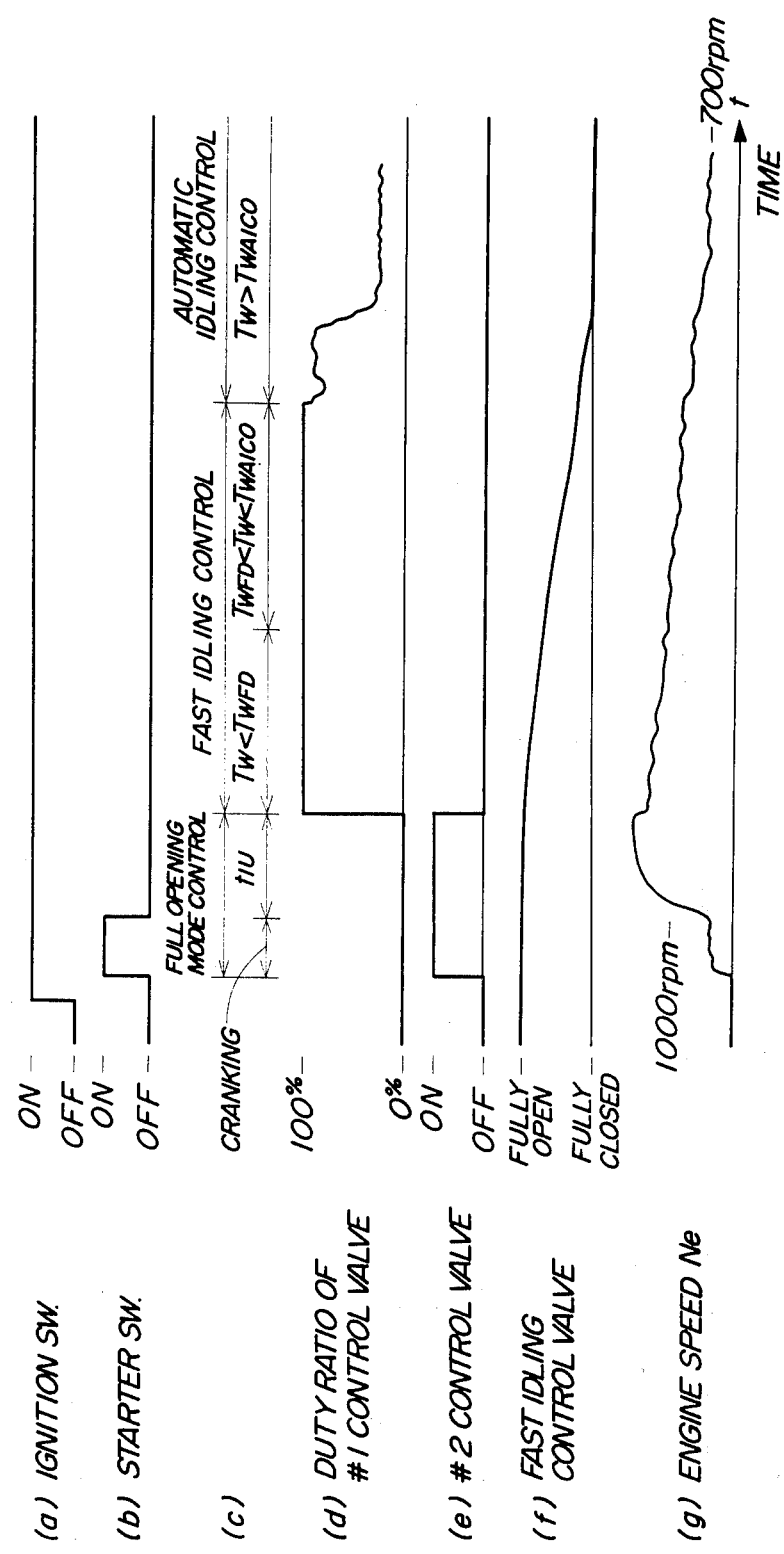
FIG. 6 is a timing chart similar to FIG. 5 but applicable when the atmospheric pressure PA is lower than the predetermined value PADX3 and at the same time higher than or equal to another predetermined value PADX2.

FIGS. 5 through 8 each illustrate a timing chart showing changes in the operative states of the first and second control valves 6, 6' and the fast idling control valve 10, and a change in the engine rotational speed, relative to the lapse of time after closing of the ignition switch 22 until the control manner of the supplementary air quantity shifts from the full opening mode control effected at engine cranking to the fast idling control effected at warming-up of the engine, and then to the automatic idling control effected at engine idling after completion of the warming-up operation. FIG. 5 applies when the atmospheric pressure PA is higher than or equal to a predetermined value PADX3 (e.g. 760 mmHg), FIG. 6 when the atmospheric pressure PA is lower than the predetermined value PADX3 and at the same time higher than or equal to a predetermined value PADX2 (e.g. 670 mmHg), FIG. 7 when the atmospheric pressure PA is lower than the predetermined value PADX2 and at the same time higher than or equal to a predetermined value PADX1 (e.g. 610 mmHg), and FIG. 8 when the atmospheric pressure PA is lower than the predetermined value PADX1, respectively.

If the answer to the question of the step 3 in FIG. 4 is no, that is, when the engine operation has got out of a cranking condition, the program proceeds to the steps 5, 6 and 7, wherein a determination is made as to whether or not a period of time tIU has elapsed since the engine was determined to be out of a cranking condition for the first time. That is, it is determined at the step 5 whether or not the engine was cranking in the immediately preceding loop, and if the answer is yes, the step 6 is executed to set the period of time tIU to a value corresponding to the engine cooling water temperature TW, as hereinafter referred to. If the answer to the question of the step 5 is no, that is, when the value of the period of time tIU has already been set, the program proceeds to the step 7 to determine whether or not the period of time tIU has elapsed since the engine operation got out of a cranking condition. If the answer to the question at the step 7 is no, that is, when the period of time tIU has not elapsed, the program proceeds to the step 4 to continually carry out the full opening mode control ((c) in FIGS. 5 through 8). When it is determined that the period of time tIU has elapsed, the program proceeds to the step 8.

The reason for continually carrying out the full opening mode control for the period of time tIU even after termination of the engine cranking is as follows: Immediately after termination of a cranking condition, a dynamo, not shown, of the engine is usually operated to charge the engine battery which has dropped in voltage due to the operation of the starter so as to recover a proper battery voltage. The operation of the dynamo forms a load on the engine to cause a drop in the idling speed of the engine, badly affecting the operating stability of the engine. Therefore, the supply of supplementary air to the engine is continued for the period of time tIU supposed to correspond to the operating time period of the dynamo immediately after completion of a cranking operation, so that the engine idling speed is maintained higher than the desired or target value employed for idling rpm feedback control, to thereby obtain stable idling operation of the engine. Further, when the engine temperature is low, the idling speed thus increased can result in prompt rise of the temperature of the cylinder walls of the engine, ensuring stable combustion within the cylinders. On the other hand, when the engine cooling water temperature is high at the start of the engine, bubbles can be formed in the pipes of the fuel feeding system, which makes the idling operation of the engine unstable. The increased idling speed can also contribute to prompt removal of bubbles in the fuel feeding system, thereby ensuring stable control of the engine speed.

Figure 9:
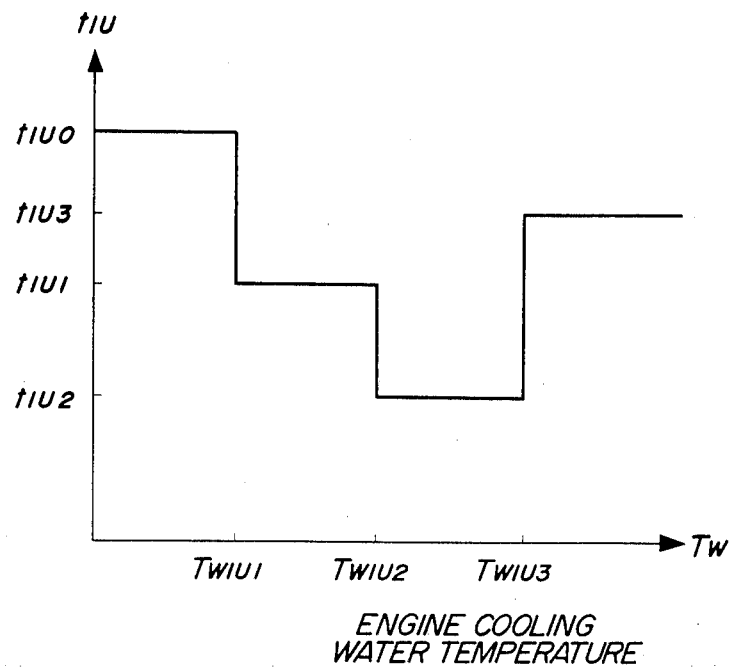
FIG. 9 is a graph showing a table of the relationship between a predetermined period of time tIU which is applied to full opening mode control carried out immediately after termination of the engine cranking, and the engine cooling water temperature TW.

Setting of the period of time tIU at the step 6 in FIG. 4 is made by the use of a table of the relationship between the engine cooling water temperature TW and the period of time tIU, shown in FIG. 9. According to the table, when the engine cooling water temperature TW is lower than a predetermined value TWIU1 (e.g. 40° C.), the period of time tIU is set to a constant value tIU0 (e.g. 5 seconds). As the engine cooling water temperature increases, the period of time tIU is set to smaller values in a stepwise manner. When the engine cooling water temperature TW is higher than a predetermined value TWIU3 (e.g. 80° C.), the period of time tIU is set to a constant value tIU3 (e.g. 4 seconds).

At the step 8 in FIG. 4, it is determined whether or not the engine cooling water temperature TW is higher than a predetermined value TWAIC0 (e.g. 50° C). This predetermined value TWAIC0 is set at a value lower than the value above which the fast idling control valve 10 is to be rendered inoperative (e.g. 60° C.), taking account of variations in the operating characteristics between fast idling control valves to be employed. Therefore, a negative answer to the question of the step 8 means that the fast idling control valve 10 is then already operating and accordingly the engine is operating in a warming-up condition. On such occasion, the program proceeds to the step 9 to carry out the fast idling control ((c) in FIGS. 5 through 8), wherein the supply of supplementary air to the engine is carried out so as to maintain the engine speed above a normal idling speed, thereby preventing engine stall and promptly completing the warming-up of the engine, as hereinafter described in detail.

If the result of the determination of the step 8 gives an affirmative answer, the program proceeds to the step 10 to carry out the automatic idling control. According to the automatic idling control, a desired idling speed is set in dependence on the electrical loads applied by the electrical devices 18, etc., and the quantity of supplementary air is controlled in a feedback manner so as to maintain the actual engine speed at the set desired idling speed, to thereby improve the operating stability of the engine during idling operation of same and prevent engine stall when the engine is decelerated into an idling condition, as hereinafter described in detail.

Figure 10:
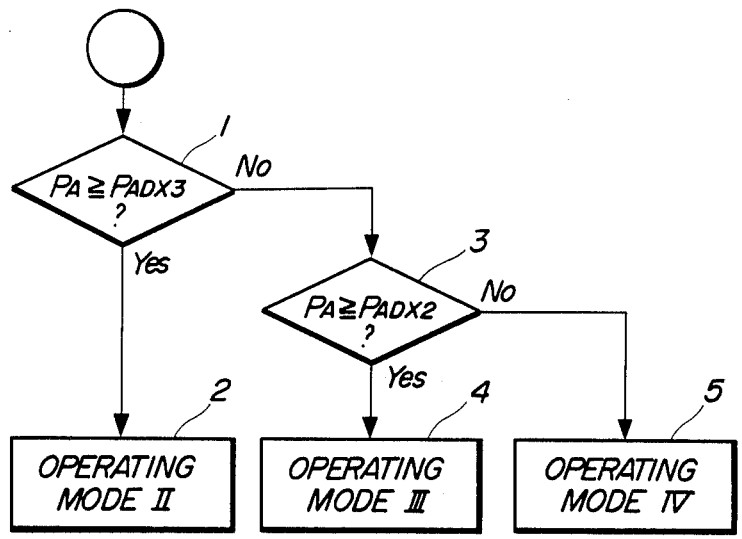
FIG. 10 is a flowchart showing details of a manner of carrying out the full opening mode control executed at the step 4 in FIG. 4.

FIG. 10 illustrates a flowchart for carrying out the full opening mode control executed at the step 4 in FIG. 4.

First, it is determined at the step 1 whether or not the detected value of the atmospheric pressure PA is higher than or equal to the predetermined value PADX3 (e.g. 740 mmHg). If the answer is yes, the first and second control valves 6, 6' are controlled according to the operating mode II, at the step 2. That is, the first control valve 6 is actuated with its valve opening ratio DOUT set to 100%, whereas the second control valve 6' is rendered inoperative ((d) and (e) in FIG. 5), as shown in TABLE 1.

If the answer to the question of the step 1 is no, the program proceeds to the step 3 to determine whether or not the detected value of the atmospheric pressure PA is higher than or equal to the predetermined value PADX2 (e.g. 670 mmHg). If the determination at the step 3 provides an affirmative answer, that is, when the detected atmospheric pressure value PA is lower than the predetermined value PADX3 and at the same time higher than or equal to the predetermined value PADX2 (i.e. PADX3>PA≧PADX2), the step 4 is executed to control the control valves 6, 6' according to the operating mode III. That is, the first control valve 6 is rendered inoperative, while the second control valve 6' alone is actuated ((d) and (e) in FIG. 6).

When the detected atmospheric pressure value PA is lower than the predetermined value PADX2 (i.e. PA<-

Figure 7:
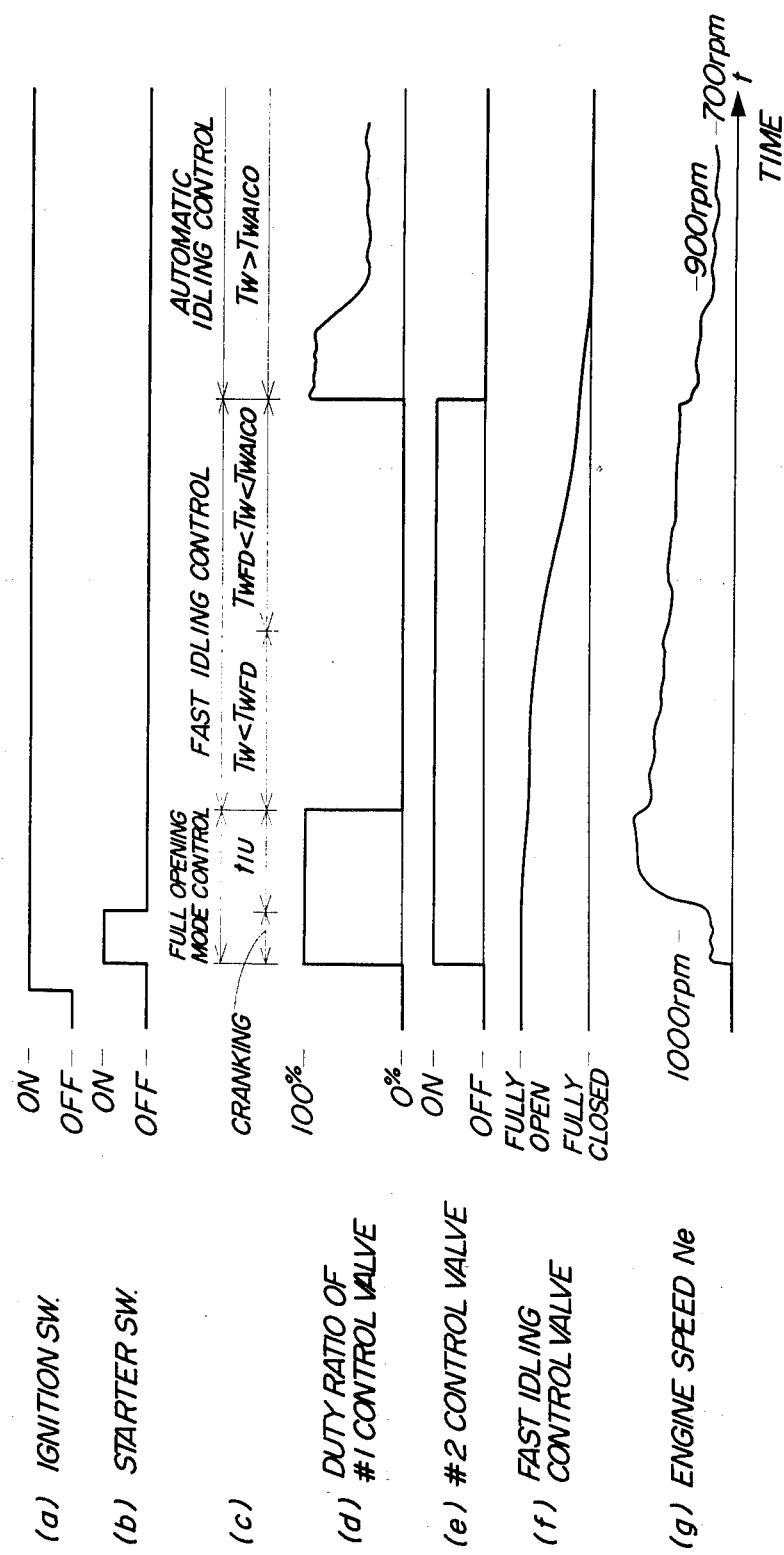
FIG. 7 is a timing chart similar to FIG. 5 but applicable when the atmospheric pressure PA is lower than the predetermined value PADX2 and at the same time higher than or equal to a predetermined value PADX1.
Figure 8:
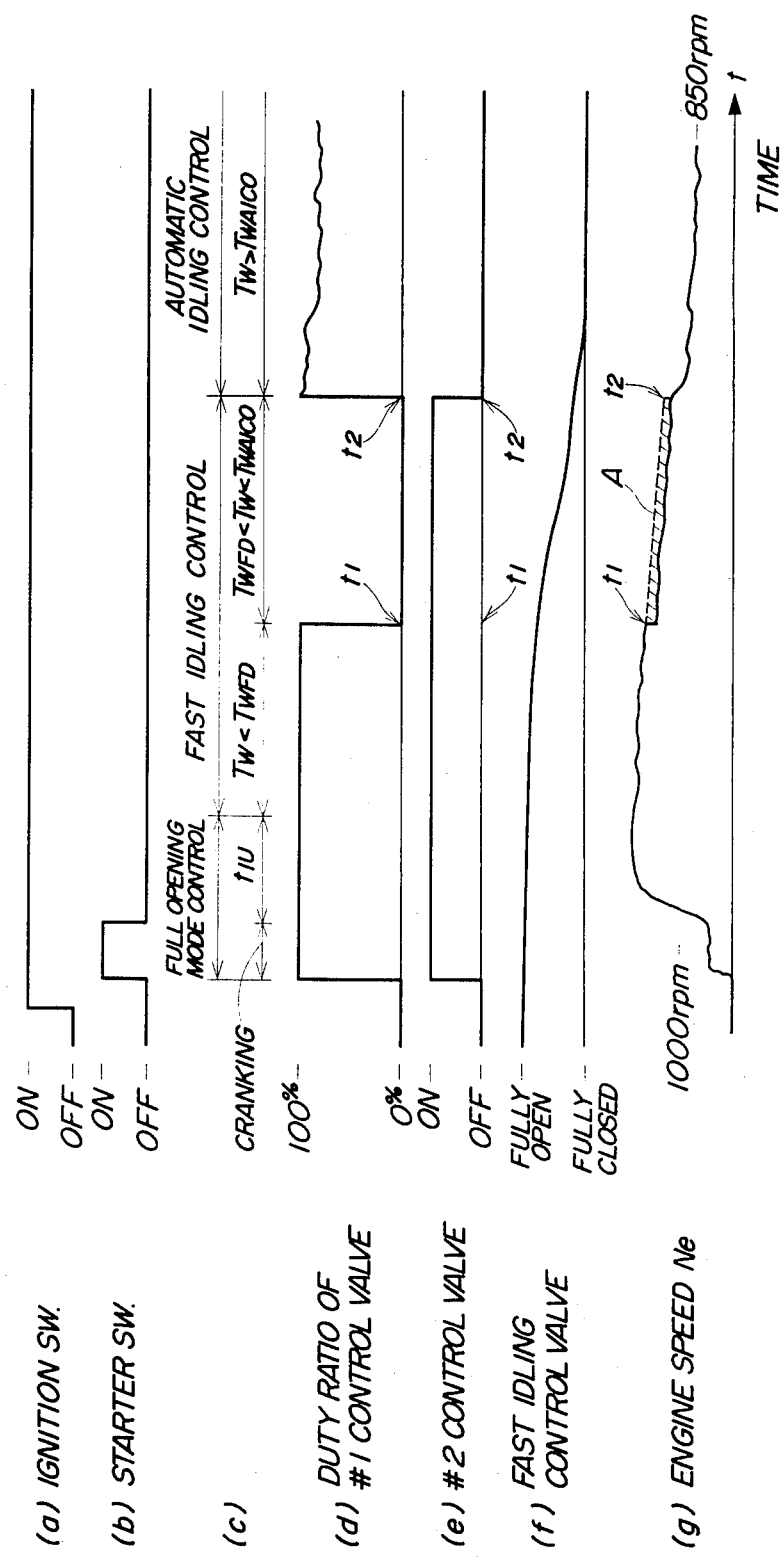
FIG. 8 is a timing chart similar to FIG. 5 but applicable when the atmospheric pressure PA is lower than the predetermined value PADX1.

PADX2), the program proceeds to the step 5 to control the control valves 6, 6' according to the operating mode IV, that is, both the first and second control valves 6, 6' are actuated ((d) and (e) in FIGS. 7 and 8).

In this manner, the engine 1 is supplied with a quantity of supplementary air which is increased as the atmospheric pressure PA decreases, to thereby facilitate departure of the engine operation from a cranking condition and maintain the engine speed above a normal idling speed after termination of the engine cranking ((g) in FIGS. 5 through 8).

Figure 11:
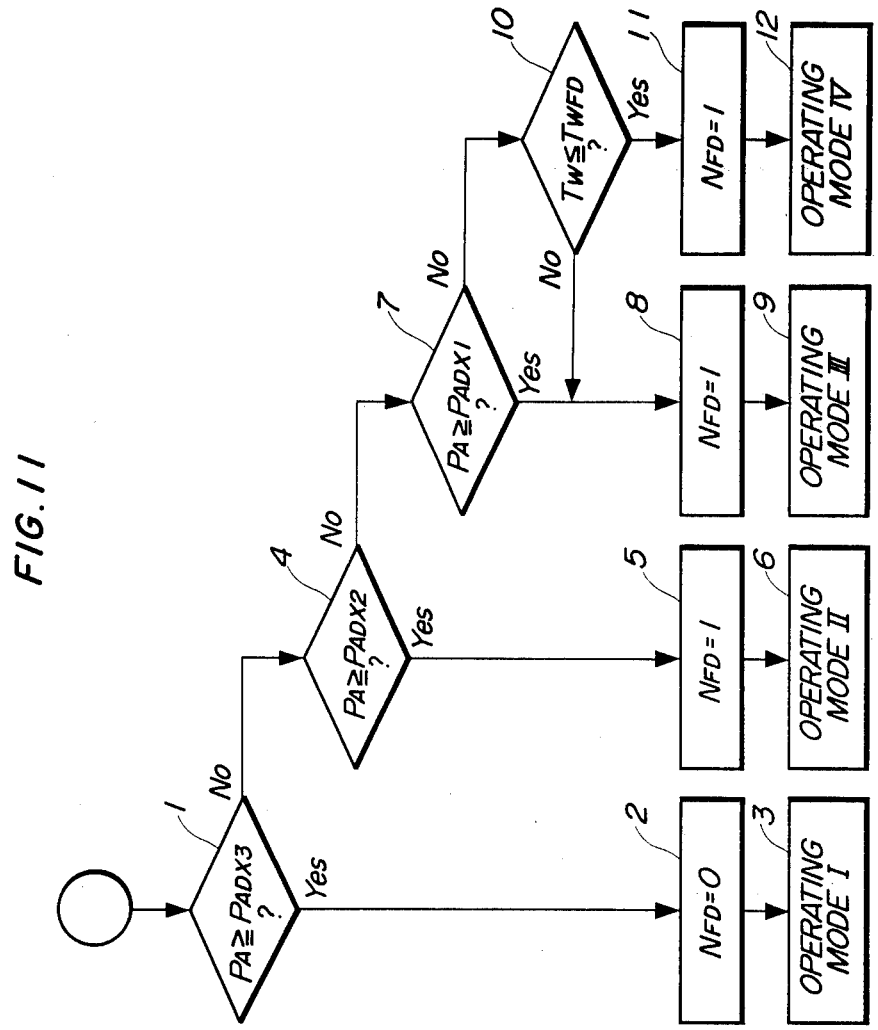
FIG. 11 is a flowchart showing details of a manner of carrying out the fast idling control executed at the step 9 in FIG. 4.

FIG. 11 shows a flowchart of a program for carrying out the fast idling control which is executed at the step 9 in FIG. 4.

First, at the step 1, it is determined whether or not the detected value of the atmospheric pressure PA is higher than or equal to the predetermined value PADX3 (740 mmHg). If the answer is yes, the step 2 is executed to set to zero the value of a program variable NFD, which is applied to the automatic idling control hereinafter described, and then the control valves 6, 6' are controlled according to the operating mode I (step 3). In the operating mode I, both the first and second control valves 6, 6' are rendered inoperative ((d) and (e) in FIG. 5), as shown in TABLE 1. This is because the fast idling control valve 10 is so designed as to supply the engine with a quantity of supplementary air required in a standard atmospheric pressure condition for itself, and therefore it is not necessary to supply additional supplementary air to the engine through the first and second control valves 6, 6' when the detected atmospheric pressure value PA assumes a value close to the standard atmospheric pressure but above the predetermined value PADX3.

If the answer to the question of the step 1 is no, the step 4 is executed to determine whether or not the detected atmospheric pressure value PA is higher than or equal to the predetermined value PADX2 (670 mmHg). If an affirmative answer is obtained at the step 4, that is, when the detected atmospheric pressure value PA is lower than the predetermined value PADX3 and at the same time higher than or equal to the predetermined value PADX2 (i.e. PADX3>PA≧PADX2), the program proceeds to the step 5 to set the value of the program variable NFD to 1, and then the first and second control valves 6, 6' are controlled according to the operating mode II ((d) and (e) in FIG. 6), at the step 6.

If the answer to the question of the step 4 is no, a determination is made as to whether or not the detected value of the atmospheric pressure PA is higher than or equal to the predetermined value PADX1 (e.g. 610 mmHg), at the step 7. If the answer is yes, that is, when the detected atmospheric pressure value PA is lower than the predetermined value PADX2 and at the same time higher than or equal to the predetermined value PADX1 (i.e. PADX2>PA≧PADX1), the program proceeds to the step 8 to set the value of the program variable NFD to 1, as in the step 5. Then, the first and second control valves 6, 6' are controlled according to the operating mode III ((d) and (e) in FIG. 7), at the step 9.

If the determination at the step 7 provides a negative answer, that is, when the detected atmospheric pressure value PA is lower than the predetermined value PADX1, the step 10 is executed to determine whether or not the detected value of the engine cooling water temperature TW is lower than or equal to a predetermined value TWFD (e.g. 40° C.) which is lower than the aforementioned predetermined value TWAIC0 (e.g. 50° C.). If the answer to the question of the step 10 is yes (i.e. TW≦TWFD), the program proceeds to the step 11 to set the value of the program variable NFD to 1, and then the control valves 6, 6' are controlled according to the operating mode IV ((d) and (e) in FIG. 8), at the step 12. When the detected engine cooling water temperature value TW is determined to be higher than the predetermined value TWFD at the step 10, the steps 8 and 9 are executed (the time intervals t1-t2 of (d) and (e) in FIG. 8). The reason for changing the operating mode of the control valves 6, 6' from the mode IV to the mode III when the engine cooling water temperature TW exceeds the predetermined value TWFD during the fast idling control in an atmospheric pressure condition below the predetermined value PADX1 is as follows: As the engine cooling water temperature TW increases during the fast idling control, the valve body 10a of the fast idling control valve 10 moves toward its closed position ((f) in FIG. 8), causing a gradual decrease in the engine speed Ne ((g) in FIG. 8). When the engine cooling water temperature TW reaches the predetermined value TWAIC0, it is judged that the warming-up of the engine has been completed, and accordingly the control manner of the supplementary air quantity is shifted from the fast idling control to the automatic idling control (the point t2 of (c) in FIG. 8). Usually the engine speed Ne has been decreased to a value in the vicinity of the normal idling speed at the time of changeover t2 from the fast idling control to the automatic idling control, and accordingly if the second control valve 6' is rendered inoperative at the time of changeover t2, a large drop can take place in the engine speed Ne, making the driver feel discomfortable. Therefore, the first control valve 6 which supplies a smaller quantity of supplementary air is beforehand rendered inoperative (the operating mode III) at the time of changeover t1 when the engine cooling water temperature TW reaches the predetermined value TWFD and the engine speed Ne is much higher than the normal idling speed (the point t1 in FIG. 8) so that no engine stall can take place, and thereafter the first control valve 6 is actuated while simultaneously the second control valve 6' is rendered inoperative (the operating mode 0) when the engine cooling water temperature TW reaches the predetermined value TWAIC0 (the point t2 in FIG. 8), to thereby prevent a sudden change in the supply quantity of supplementary air and accordingly an abrupt drop in the engine speed.

Further, if the control in operating mode IV is continually carried out without a changeover of operating mode at the point of time t1, the engine speed Ne decreases along an operating line indicated by the broken line of (g) in FIG. 8, requiring an additional fuel amount corresponding to the region A hatched in FIG. 8, to increase the fuel consumption of the engine and badly affect the emission characteristics of same.

Figure 12:
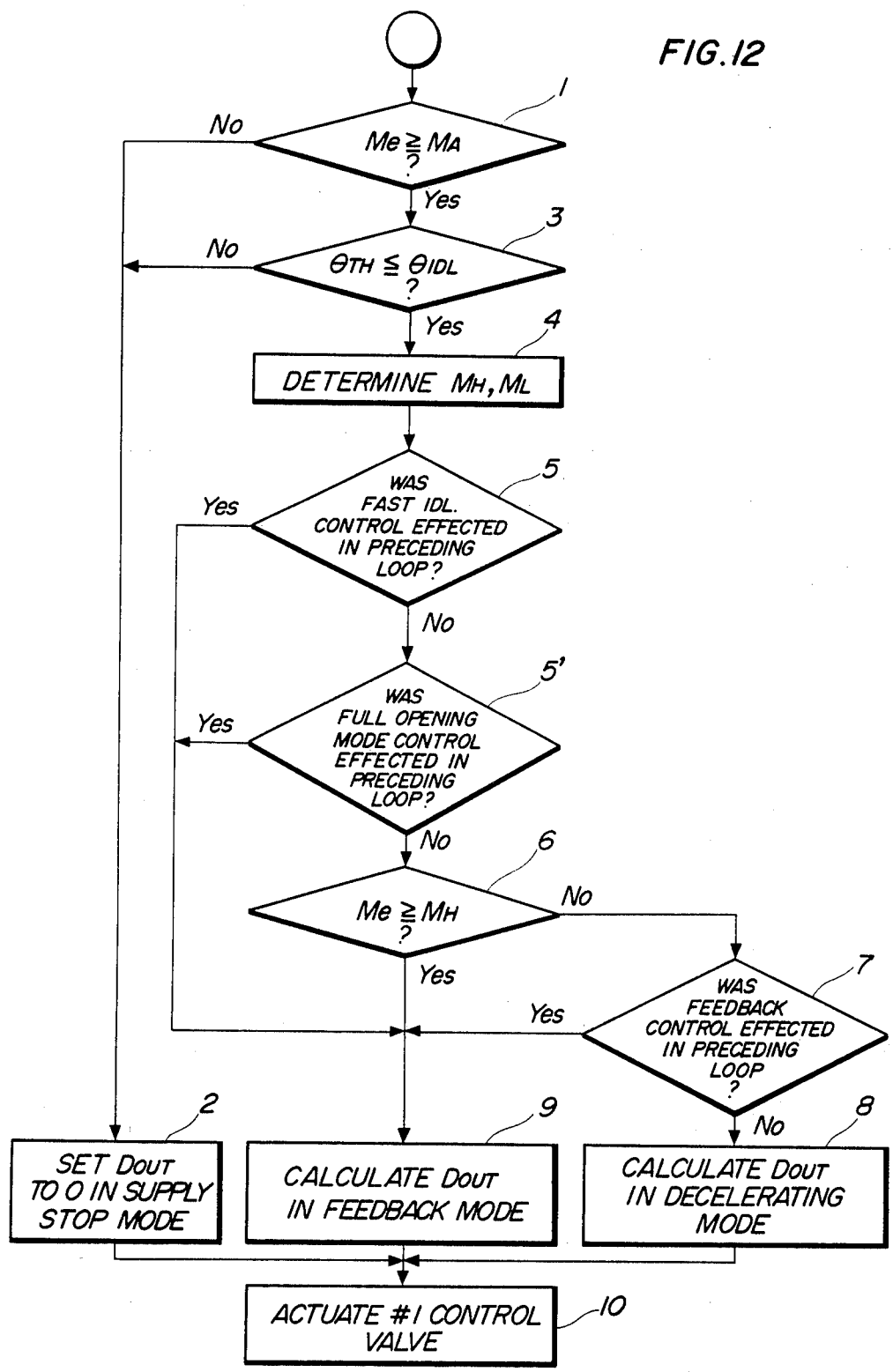
FIG. 12 is a flowchart showing details of a manner of carrying out the automatic idling control executed at the step 10 in FIG. 4.

FIG. 12 illustrates a flowchart of a program for carrying out the automatic idling control which is executed at the step 10 in FIG. 4.

According to the automatic idling control, the control valves 6, 6' are controlled in the operating mode 0 wherein the valve opening duty ratio of the first control valve 6 is controlled while the second control valve 6' is rendered inoperative, as hereinbefore mentioned.

First, at the step 1, a determination is made as to whether or not the count value Me proportional to the reciprocal of the actual engine speed Ne supplied from the Me value counter 502 in FIG. 3 is larger than or equal to a value MA corresponding to the reciprocal of a predetermined value NA (e.g. 1500 rpm) which is higher than the desired idling speed. If the answer is no (i.e. Me<MA), that is, when the engine speed Ne is higher than the predetermined speed NA, the program proceeds to the step 2 to set the valve opening duty ratio DOUT of the first control valve 6 to zero (hereinafter called "supply stop mode") as there is no fear of engine stall, engine vibrations, etc. which can take place when the engine speed Ne is lower than the predetermined speed NA.

If the answer to the question of the step 1 is yes (i.e. Me≧MA), that is, when the engine speed Ne is lower than or equal to the predetermined speed NA, the step 3 is executed to determine whether or not the valve opening $\theta$TH of the throttle valve 21 in FIG. 1 is smaller than or equal to a predetermined value $\theta$IDL which can be regarded as equal to a substantially closed position. If the determination at the step 3 provides a negative answer, the program proceeds to the step 2 to carry out supply stop mode, while if an affirmative answer is obtained, the step 4 is executed to set values MH and ML corresponding, respectively, to the reciprocals of an upper limit value NH and a lower limit value NL of the desired idling speed. The upper and lower limit values MH, ML are set to such appropriate values as to ensure stable idling operation of the engine, in dependence on the values of the engine operation parameter signals indicative of the engine cooling water temperature TW and the loaded conditions of the engine, such as the operative state of the air conditioner.

Then, it is determined whether or not the fast idling control or the full opening mode control is effected in the immediately preceding loop, at the steps 5 and 5'. If one of the determinations at the steps 5, 5' provides an affirmative answer, the program proceeds to the step 9 to calculate the valve opening duty ratio DOUT of the first control valve 6 in feedback mode, as hereinafter described in detail. On the other hand, if both the determinations at the steps 5, 5' provide negative answers, the step 6 is executed to determine whether or not the value Me proportional to the reciprocal of the engine speed Ne is larger than or equal to the upper limit value MH set at the step 4. If the answer to the question of the step 6 is no (i.e. Me<MH), that is, when the engine speed Ne is higher than the upper limit value NH of the desired idling speed, it is determined whether or not feedback mode control was effected in the immediately preceding loop, at the step 7. If the determination at the step 7 provides a negative answer, it is judged that the engine is operating in a condition where decelerating mode control should be effected, and accordingly the program proceeds to the step 8 to calculate the valve opening duty ratio DOUT of the first control valve 6 for decelerating mode control. Calculation of the valve opening duty ratio DOUT in decelerating mode is made, for instance, by adding a value DE determined in response to the operative states of the electrical devices 18, to a predetermined value DX hereinafter referred to, to obtain the sum as the valve opening duty ratio DOUT value.

Figure 14:
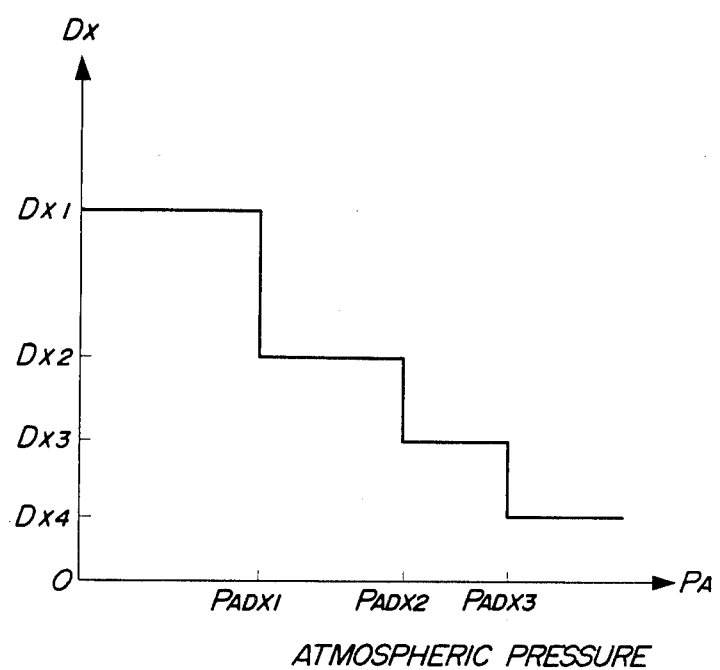
FIG. 14 is a graph showing a table of the relationship between a predetermined value DX to be set as a valve opening duty ratio DOUT for the first control valve in decelerating mode control, and the atmospheric pressure PA.

FIG. 14 shows an example of a table of the relationship between the predetermined value DX and the atmospheric pressure PA. As shown in the figure, there are provided a plurality of, e.g. four, regions of the atmospheric pressure PA, that is, a first region (PA<PADX1 (e.g. 610 mmHg)), a second region (PADX1≦PA<PADX2 (e.g. 670 mmHg)), a third region (PADX2≦PA<PADX3 (e.g. 740 mmHg)), and a fourth region (PA≧PADX3), while the value DX is set to one of four constant values DX1 (e.g. 80%), DX2 (e.g. 40%), DX3 (e.g. 30%) and DX4 (e.g. 20%) to be applied, respectively, to the first, second, third and fourth regions, so that the value DX decreases with an increase in the atmospheric pressure PA. These values DX1, DX2, DX3 and DX4 are stored in the ROM 507. Therefore, as the atmospheric pressure PA decreases as the engine goes to higher altitudes, the value DX, and accordingly the valve opening duty ratio DOUT, is set to larger values to increase the quantity of supplementary air being supplied to the engine.

In this manner, when the engine speed Ne is lower than the predetermined value NA and at the same time larger than the upper limit value NH of the desired idling speed while the engine is decelerated with the throttle valve fully closed, the valve opening duty ratio DOUT of the first control valve 6 is calculated in decelerating mode. By thus controlling the valve opening duty ratio in decelerating mode, an abrupt drop in the engine speed can be prevented even in the event of disengagement of the clutch at deceleration of the engine, to thereby avoid engine stall to be caused by a delay in the supply of supplementary air during the following feedback mode control which is initiated when the engine speed Ne becomes smaller than the upper limit value NH.

If the determination at the step 6 in FIG. 12 provides an affirmative answer (i.e. Me≧MH), that is, when the engine speed Ne becomes smaller than the upper limit value NH of the desired idling speed, the program proceeds to the step 9 to calculate the valve opening duty ratio DOUT for feedback mode control. This step 9 is also executed when the determination at the step 7 provides an affirmative answer (yes). That is, if the feedback mode control was effected in the immediately preceding loop, or in other words, once the engine speed Ne decreases below the upper limit value NH of the desired idling speed, the supplementary air quantity is continually controlled in feedback mode even when the engine speed Ne exceeds the upper limit value NH, so long as the throttle valve 21 remains fully closed.

The CPU 503 then supplies the driving circuit 511 in FIG. 3 with a control signal corresponding to the valve opening duty ratio DOUT determined at the step 2, 8 or 9, to open the first control valve 6 for a period of time corresponding to the duty ratio DOUT (step 10).

Figure 13:
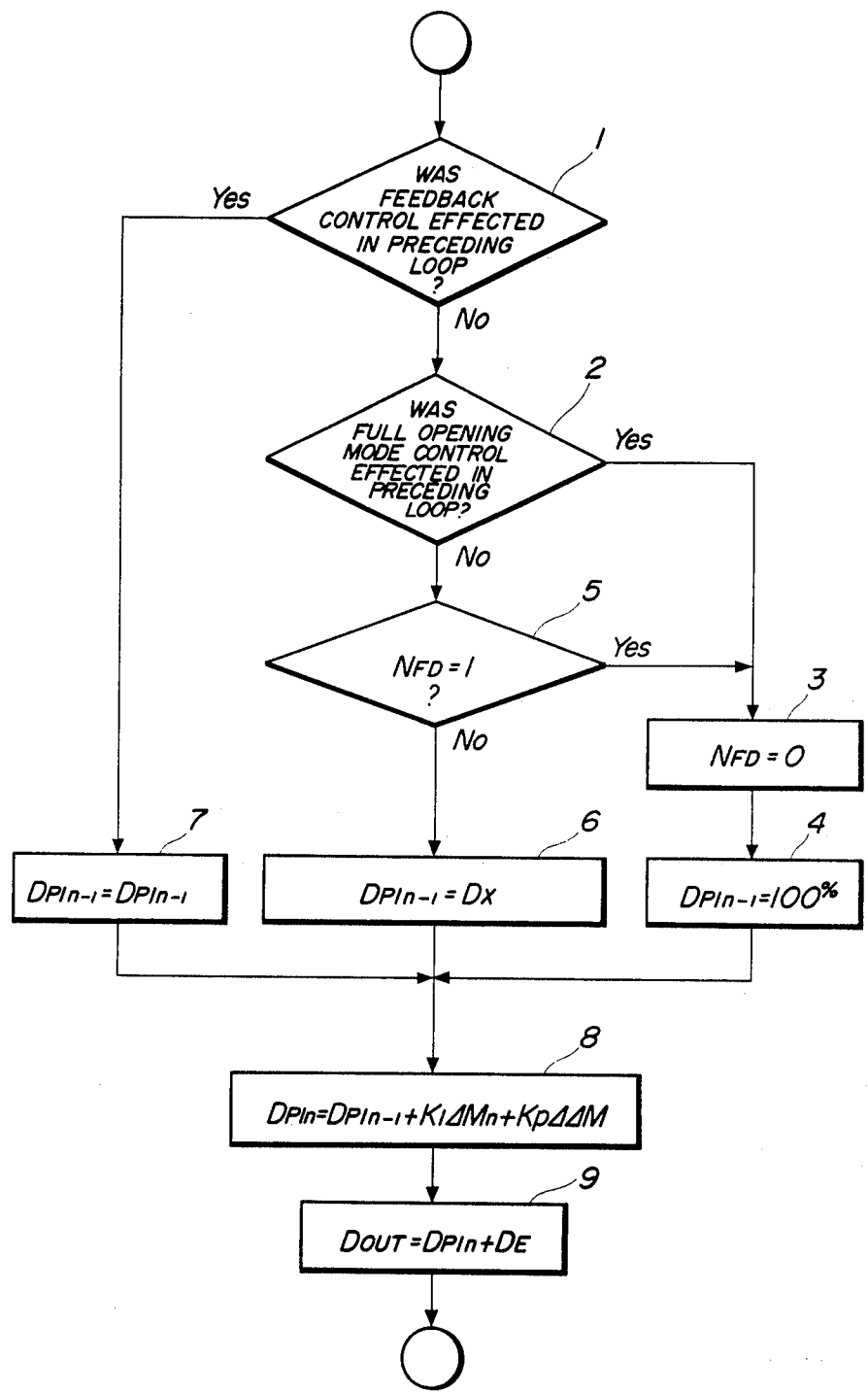
FIG. 13 is a flowchart of a manner of carrying out feedback control of the valve opening duty ratio DOUT of the first control valve, which is executed at the step 9 in FIG. 12.

FIG. 13 shows a flowchart of a manner for calculating the valve opening duty ratio DOUT of the first control valve 6 in feedback mode, which is executed in the step 9 in FIG. 12. The valve opening duty ratio DOUT of the first control valve 6 is calculated as the sum of values of a feedback mode term DPIn and the electrical load term DE, as hereinafter described in detail. The feedback mode term value DPIn is obtained as the sum of a value of the feedback mode term DPIn-1 determined in the immediately preceding loop, a value of an integration control term KI$\Delta$M, and a value of a proportional control term KP$\Delta\Delta$M.

First, at the step 1, it is determined whether or not the feedback mode control was effected in the immediately preceding loop. If the answer is no, the program proceeds to the step 2 wherein a determination is made as to whether or not the full opening mode control was carried out in the immediately preceding loop. If the full opening mode control was effected in the immediately preceding loop, this means that the feedback mode term DPIn was not calculated in the same loop. On such occasion, the value of the program variable NFD is reset to zero at the step 3, and then the feedback mode term DPIn-1 has its value set to 100% (step 4).

If the answer to the question of the step 2 is no, the step 5 is executed to determine whether or not the value of the program variable NFD, which has been set during the fast idling control (FIG. 11), is equal to 1. An affirmative determination at the step 5 means that at least either one of the first and second control valves 6, 6' was operated during the fast idling control, and on such occasion, the steps 3 and 4 are executed to set the value of the feedback mode term DPIn-1 to 100%.

On the other hand, if the answer to the question of the step 5 is no, that is, when the automatic idling control is initiated after execution of the fast idling control in an atmospheric pressure condition above the predetermined value PADX3 (740 mmHg), or when the feedback mode control is effected at the step 9 in FIG. 12 following the deceleraing mode control at the step 8, the value of the feedback mode term DPIn-1 is set to the predetermined value DX at the step 6.

If the determination at the step 1 provides an affirmative answer, that is, when the feedback mode control was effected in the immediately preceding loop as in the present loop, the program proceeds to the step 7 to employ as the value of the feedback mode term DPIn-1 a value of the feedback mode term DPIn-1 which was set in the preceding loop.

Then, the program proceeds to the step 8 wherein values of the integration control term $KI\Delta M$ and the proportional control term $KP\Delta\Delta M$ are added to the value of the feedback mode term DPIn-1 set at the step 4, 6 or 7, and the resulting sum is employed as the feedback mode term value DPIn applicable in the present loop. The value of the integration control term $KI\Delta M$ is calculated as a product value obtained by multiplying the value of an amount by which the actual engine speed Ne is deviated from the engine speed range defined by the upper and lower limit values NH, NL of the desired idling speed, i.e. a value $\Delta Mn$ proportional to the reciprocal of a difference between the actual engine speed Ne and the upper or lower limit value NH, NL, by a constant value KI. The proportional control term value $KP\Delta\Delta M$ is a product value obtained by multiplying a difference value $\Delta\Delta M$ between the $\Delta Mn$ value determined in the present loop and an $\Delta Mn-1$ value determined in the immediately preceding loop, by a constant value KP. When the actual engine speed Ne falls within the range defined by the upper and lower limit values NH, NL of the desired idling speed, the integration control term $KI\Delta Mn$ and the proportional control term $KP\Delta\Delta M$ have their values both set to zero. That is, on this occasion, the value of the feedback mode term DPIn applicable in the present loop is set to the same value as that applied in the immediately preceding loop.

Added to the feedback mode term value DPIn thus determined is a value of the electrical load term DE, and the resulting sum value is employed as the valve opening duty ratio DOUT of the first control valve 6 applicable in the present loop, at the step 9. The electrical load term DE has its value set to a value corresponding to the magnitude of the engine load applied by the electrical devices 18. Even when the valve opening duty ratio DOUT calculated at the step 9 assumes a value exceeding 100%, the actually applied duty ratio DOUT is set to 100%.

As stated above, when the automatic idling control is effected immediately after termination of the full opening mode control or immediately after termination of the fast idling control in a low atmospheric pressure condition, the valve opening duty ratio DOUT is set to 100% at the time of initiation of the automatic idling control, and thereafter gradually decreased, thereby ensuring smooth shifting of the engine speed Ne to the desired idling speed.

What is claimed is:

1. A method of controlling the quantity of intake air being supplied to an internal combustion engine having an intake passage, a throttle valve arranged in said intake passage, a first auxiliary air passage bypassing said throttle valve, a first control valve arranged in said first auxiliary air passage for controlling the quantity of supplementary air to be supplied to said engine through said first auxiliary air passage by means of on-off control of the opening area of said first auxiliary air passage, a second auxiliary air passage bypassing said throttle valve, and a second control valve arranged in said second auxiliary air passage for controlling the quantity of supplementary air to be supplied to said engine through said second auxiliary air passage by means of on-off control of the opening area of said second auxiliary air passage, the method comprising the steps of: (1) detecting atmospheric pressure encompassing said engine; (2) determining whether or not said engine is operating in a particular operating condition; and (3) selectively actuating said first and second control valves in response to the value of the atmospheric pressure detected at said step (1) in such a manner that the sum of the opening areas of said first and second auxiliary air passages increases as the detected value of the atmospheric pressure decreases, when said engine is determined to be operating in said particular operating condition.

2. A method as claimed in claim 1, wherein the opening area of said first auxiliary air passage assumed when said first control valve is open is smaller than the opening area of said second auxiliary air passage assumed when said second control valve is open.

3. A method as claimed in claim 2, wherein as the value of the atmospheric pressure detected at said step (1) decreases, said first and second control valves are selectively actuated in a manner such that (a) said first control valve is actuated and said second control valve is rendered inoperative, (b) said first control valve is rendered inoperative and said second control valve is actuated, and (c) both said first and second control valves are actuated, in the order mentioned.

4. A method as claimed in claim 1, wherein said engine is determined to be operating in said particular operating condition when it is in a cranking condition.

5. A method as claimed in claim 1, wherein said engine is determined to be operating in said particular operating condition when a predetermined period of time has not yet elapsed after said engine has got out of a cranking condition.

6. A method as claimed in claim 5, wherein said predetermined period of time is a function of the temperature of said engine.

7. A method as claimed in claim 1, wherein said engine is determined to be operating in said particular operating condition when said engine is in a warming-up condition.

8. A method as claimed in claim 7, including the step of detecting the temperature of said engine, and wherein said first and second control valves are selectively actuated in response to the temperature of said engine in such a manner that the sum of the opening areas of said first and second auxiliary air passages decreases as the detected value of the temperature of said engine increases, so long as the value of the atmospheric pressure detected at said step (1) remains constant.

9. A method as claimed in claim 7, wherein said engine includes a third auxiliary air passage bypassing said throttle valve, and a third control valve arranged in said third auxiliary air passage and adapted to increase the opening area of said third auxiliary air passage with a decrease in the temperature of said engine for controlling the quantity of supplementary air to be supplied to said engine through said third auxiliary air passage to an appropriate value when said engine is operating in a warming-up condition at a predetermined reference atmospheric pressure, the opening area of said first auxiliary air passage assumed when said first control valve is open being smaller than the opening area of said second auxiliary air passage assumed when said second control valve is open.

10. A method as claimed in claim 9, wherein said first control valve has a valve opening period thereof controlled with a duty ratio corresponding to the difference between the actual engine speed and a desired engine speed when said engine is operating in an idling condition immediately after completion of warming-up operation of same.

11. A method as claimed in claim 10, including the step of detecting the temperature of said engine, and wherein said duty ratio control of said first control valve is initiated when the detected value of the temperature of said engine increases across a predetermined value.

12. A method as claimed in claim 11, wherein the duty ratio for opening said first control valve has an initial value thereof set to such a value that the maximum possible quantity of supplementary air is supplied to said engine through said first control valve when the value of the atmospheric pressure detected at said step (1) is lower than a predetermined value, and set to such a value that a quantity of supplementary air intermediate between the maximum possible quantity and the minimum possible quantity is supplied to said engine through said first control valve when the detected value of the atmospheric pressure is higher than said predetermined value, whereby said duty ratio control of said first control valve is initiated with the initial value of the duty ratio thus set.

13. A method as claimed in claim 9 or 10, including the step of detecting the temperature of said engine, and wherein when the value of the atmospheric pressure detected at said step (1) is lower than a predetermined value and at the same time the detected value of the temperature of said engine is lower than a predetermined value, both said first and second control valves are actuated, whereas when the detected value of the atmospheric pressure is lower than said predetermined value and at the same time the detected value of the temperature of said engine is higher than said predetermined value, said first control valve is rendered inoperative while said second control valve is actuated.

14. A method as claimed in claim 13, wherein said predetermined value of the temperature of said engine is set at a value lower than a set value above which said third control valve is fully closed.

* * * * *